(12) United States Patent
Kejariwal et al.

(10) Patent No.: US 8,621,424 B2
(45) Date of Patent: Dec. 31, 2013

(54) COMPILER BASED CODE MODIFICATION FOR USE IN DOCUMENT RANKING

(75) Inventors: Arun Kejariwal, San Jose, CA (US); Girish Vaitheeswaran, Fremont, CA (US); Sapan Panigrahi, Castro Valley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1015 days.

(21) Appl. No.: 12/165,457

(22) Filed: Jun. 30, 2008

(65) Prior Publication Data

US 2009/0328014 A1 Dec. 31, 2009

(51) Int. Cl.
*G06F 9/44* (2006.01)
*G06F 9/45* (2006.01)
*G06F 13/00* (2006.01)

(52) U.S. Cl.
USPC ............................ 717/106; 717/153; 710/104

(58) Field of Classification Search
USPC .................................. 717/140; 714/104–174
See application file for complete search history.

(56) References Cited

U.S. PATENT DOCUMENTS

| | | | |
|---|---|---|---|
| 6,275,938 B1 * | 8/2001 | Bond et al. ...................... | 726/23 |
| 6,817,013 B2 * | 11/2004 | Tabata et al. ................... | 717/151 |
| 6,941,545 B1 * | 9/2005 | Reese et al. .................... | 717/130 |
| 6,968,545 B1 * | 11/2005 | Krech et al. .................... | 717/153 |
| 7,688,727 B1 * | 3/2010 | Ferguson et al. ........... | 370/230.1 |
| 7,827,523 B2 * | 11/2010 | Ahmed et al. .................. | 717/106 |
| 2004/0003384 A1 * | 1/2004 | Pechtchanski et al. ....... | 717/158 |
| 2004/0215606 A1 | 10/2004 | Cossock | |
| 2005/0131853 A1 | 6/2005 | Sampath et al. | |
| 2005/0166195 A1 * | 7/2005 | Kawahito ....................... | 717/154 |
| 2005/0193160 A1 | 9/2005 | Bhatt et al. | |
| 2005/0289264 A1 * | 12/2005 | Illowsky et al. ............... | 710/104 |
| 2006/0130021 A1 * | 6/2006 | Plum et al. ..................... | 717/140 |
| 2006/0206886 A1 * | 9/2006 | Wu et al. ........................ | 717/151 |
| 2007/0022412 A1 * | 1/2007 | Tirumalai et al. ............. | 717/140 |
| 2007/0157138 A1 * | 7/2007 | Ciolfi et al. ........................ | 716/4 |

OTHER PUBLICATIONS

Hazelwood et al., "Adaptive Online Context-sensitive Inlining" Proceedings of the International Symposium on Code Generation and Optimization (CGO '03), IEEE, 2003, 12 pages.

Piumarta et al., "Optimizing. Direct Threaded Code by Selective Inlining" ACM, 1998, pp. 291-300.

* cited by examiner

*Primary Examiner* — Isaac Tecklu
*Assistant Examiner* — Mohammad Kabir
(74) *Attorney, Agent, or Firm* — Berkeley Law & Technology Group, LLP

(57) ABSTRACT

The subject matter disclosed herein relates to alter an expression of executable instructions via a compiler component for use in ranking of electronic documents.

13 Claims, 6 Drawing Sheets

COMPILER BASED CODE MODIFICATION FOR USE IN DOCUMENT RANKING

BACKGROUND

Data processing tools and techniques continue to improve. Information in the form of data is continually being generated or otherwise identified, collected, stored, shared, and analyzed. Databases and other like data repositories are commonplace, as are related communication networks and computing resources that provide access to such information.

The Internet is ubiquitous; the World Wide Web provided by the Internet continues to grow with new information seemingly being added every second. To provide access to such information, tools and services are often provided, which allow for the copious amounts of information to be searched through in an efficient manner. For example, service providers may allow for users to search the World Wide Web or other like networks using search engines. Similar tools or services may allow for one or more databases or other like data repositories to be searched.

With so much information being available, there is a continuing need for methods and systems that allow for pertinent information to be analyzed in an efficient manner. Search engines, such as, for example, those provided over the web by Yahoo!, Google, and other web sites may be used by individuals to gather information. Typically, a user may input a query term and/or phrase and the search engine may return one or more links to sites and/or documents related to the query. The links returned may be related, or they may be completely unrelated, to what the user was actually looking for. The "relatedness" of results to the query may be in part a function of the actual query entered as well as the robustness of the search system (underlying collection system) used.

Growth in the number of available web pages may make searching for relevant information difficult. To this end, various search engines have been developed over the last decade. One of the components of a search engine may rank electronic documents corresponding to a query specified by a user in order of relevance. Such document ranking may be done based on a multitude of metrics such as degree of query match and freshness of the document. Other metrics may be utilized in advanced rankings of electronic documents to improve the quality of search results. However, such an increase in metrics may adversely affect the query processing time.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Figure 1:
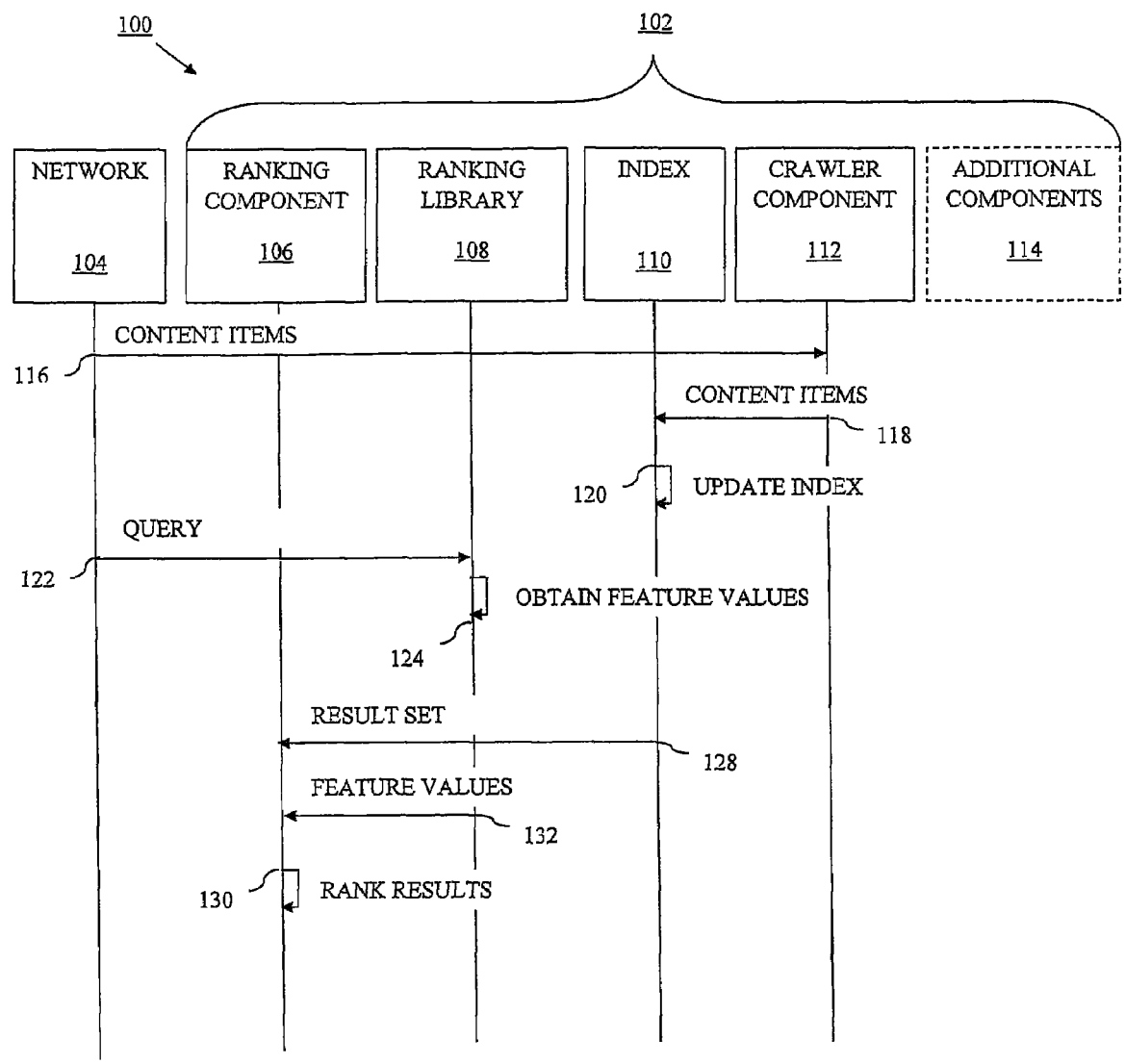
FIG. 1 is a flow diagram illustrating a procedure for indexing and/or ranking electronic documents in accordance with one or more embodiments.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

As discussed above, growth in the number of available web pages may make searching for relevant information difficult. To this end, various search engines have been developed over the last decade. One of the components of a search engine may rank electronic documents corresponding to a query specified by a user in order of relevance. Such document ranking may be done based on a multitude of metrics such as degree of query match and freshness of the document. Other metrics may be utilized in advanced rankings of electronic documents to improve the quality of search results. However, such an increase in metrics for use in advanced rankings of electronic documents may adversely affect the query processing time.

As will be described in greater detail below, embodiments described herein may relate to compiler based code modifications for use in ranking of electronic documents via a document ranking component. Such compiler based code modifications, as described below, may be utilized to improve search engine run-time performance for electronic document ranking. Accordingly, advanced rankings of electronic documents may be performed with a reduced impact on query processing time, based at least in part on improving run-time performance via compiler based code modifications.

Often, prior attempts to improve run-time performance of ranking of search results have focused on reworking the algorithm of the search engine itself. Additionally, some previously proposed techniques to improve run-time performance may involve remodeling of tree-traversal-type ranking procedures into a table look-up-type procedure.

Conversely, as will be described in greater detail below, embodiments described herein relate to altering an expression of executable instructions through compiler based procedures. In contrast, existing approaches that focus at algorithmic level optimizations may be not address an underlying micro-architecture of a given computing platform. Further, compiler based procedures may be applied to a search engine without directly reworking the algorithm of the search engine itself. Additionally or alternatively, such compiler based procedures may be applied to more than one search engine, without directly reworking the algorithms of each search engine individually.

Procedure 100 illustrated in FIG. 1 may be used to index and/or rank electronic documents in accordance with one or more embodiments, for example, although the scope of claimed subject matter is not limited in this respect. Additionally, although procedure 100, as shown in FIG. 1, comprises one particular order of actions, the order in which the actions are presented does not necessarily limit claimed subject matter to any particular order. Likewise, intervening actions not shown in FIG. 1 and/or additional actions not shown in FIG. 1 may be employed and/or actions shown in FIG. 1 may be eliminated, without departing from the scope of claimed subject matter.

Procedure 100 depicted in FIG. 1 may in alternative embodiments be implemented in software, hardware, and/or firmware, and may comprise discrete operations. As illustrated, procedure 100 governs the operation of a search engine 102. Search engine 102 may be capable of searching for content items of interest. Search engine 102 may communicate with a network 104 to access and/or search available information sources. By way of example, but not limitation, network 104 may include a local area network, a wide area network, the like, and/or combinations thereof, such as, for example, the Internet. Additionally or alternatively, search engine 102 and its constituent components may be deployed across network 104 in a distributed manner, whereby components may be duplicated and/or strategically placed throughout network 104 for increased performance.

Search engine 102 may include multiple components. For example, search engine 102 may include a ranking component 106, a ranking library 108, an index 110, and/or a crawler component 112, as will be discussed in greater detail below. Additionally or alternatively, search engine 102 also may include additional components 114 that are not described in detail herein. For example, search engine 102 also may include a search component capable of searching the content items retrieved by crawler component 112.

Additionally, although the additional components 114 of search engine 102, as shown in FIG. 1, have been described above with non-limiting example components, the examples given do not necessarily limit claimed subject matter to any particular configuration. For example, further additional components 114 not discussed with respect to FIG. 1 may be employed, without departing from the scope of claimed subject matter. Further, although the additional components 114 of search engine 102, as shown in FIG. 1, have been described above with non-limiting example components, the examples given may be eliminated, without departing from the scope of claimed subject matter.

Crawler component 112 may retrieve content items from network 104, as illustrated at action 116. For example, crawler component 112 may retrieve content items and store a copy in a cache (not shown). Additionally, crawler component 112 may follow links between content items so as to navigate across the Internet and gather information on an extensive number of electronic documents. For example, such content items may comprise a set of electronic documents retrieved from network 104.

As used herein, the term "electronic document" is meant to include any information in a digital format that may be perceived by a user if displayed by a digital device, such as, for example, a computing platform. For one or more embodiments, an electronic document may comprise a web page coded in a markup language, such as, for example, HTML (hypertext markup language). However, the scope of claimed subject matter is not limited in this respect. Also, for one or more embodiments, the electronic document may comprise a number of elements. The elements in one or more embodiments may comprise text, for example, as may be displayed on a web page. Also, for one or more embodiments, the elements may comprise a graphical object, such as, for example, a digital image.

Data from content items gathered by crawler component 112 may be sent to index 110, as illustrated at action 118. Index 110 may index such content items, as illustrated at action 120. For example, index 110 may be updated based at least in part on content items comprising a set of electronic documents. Index 110 may parse a given content item into indexable terms, such as concepts and/or entities. Additionally, identifying information of the electronic documents associated with such concepts and/or entities also may be indexed so that a given concept and/or entity may be located via a corresponding electronic document. Index 110 may index terms and may store information regarding which documents contain a given concept and/or entity based at least in part on such indexed terms. However, index 110 may not necessarily index a complete series of terms associated with a given concept and/or entity. For example, an entity "Tom Cruise" may be indexed based at least in part on the single term "tom" and/or on the single term "cruise". In such a case, index 110 may store which electronic documents contain such single terms, and/or may store information regarding an offset and/or position of such single terms within such electronic documents. Accordingly, search engine 102 may determine which electronic documents contain an entity "Tom Cruise" based at least in part on checking a position of the individual terms "tom" and/or "cruise" within such electronic documents.

Ranking library 108 may obtain data regarding feature values that may associate a numerical value to an electronic document, a term from an electronic document, and/or some other aspect of an electronic document, as illustrated at action 122. Such feature values may be determined based at least in part on a comparison of terms from a query with aspects of one or more electronic documents. For example, a feature value may be determined so as to indicate the degree that individual terms and/or groups of terms from a query match with individual terms and/or groups of terms associated with a given electronic document. Additionally or alternatively, such feature values may be determined based at least in part on aspects of an electronic document itself without a comparison to a query. For example, a feature value may be determined that corresponds to an indication of whether an electronic document relates to "entertainment" information, "news" information, and/or the like.

Ranking component 106 may receive a search result set from index 110 based at least in part on query 122, as illustrated at action 128. For example, search engine 102 also may include a search component (not shown) capable of searching the electronic documents indexed within index 110 so as to generate a result set. Ranking component 106 may be capable of ranking such a result set such that the most relevant electronic documents in the result set are presented to a user first, according to descending relevance, as illustrated at action 130. For example, the first electronic document in the result set may be the most relevant in response to a query and the last electronic document in the result set may be the least relevant while still falling within the scope of the query. Such a ranked result set may comprise a search result that may be transmitted to a user via a search interface.

Such a ranking procedure may be based at least in part on the feature values from ranking library 108. Such feature values may be transferred to ranking component 106 from ranking library 108, as illustrated at action 132. Ranking library 108 may store such feature values within a structure, such as an array, for example. Such feature values may be stored within index 110, for example. Further, feature values may be computed at runtime, e.g., during the execution of a given query, and may not necessarily be stored prior to being transferred to ranking component 106.

Once ranking component 106 has received a result set and feature values, ranking component 106 may determine an importance score associated with the electronic documents from the result set based at least in part on such feature values. Such an importance score may be assigned to electronic documents depending on the traversing of one or more trees based at least in part on feature values associated with such electronic documents.

Figure 2:
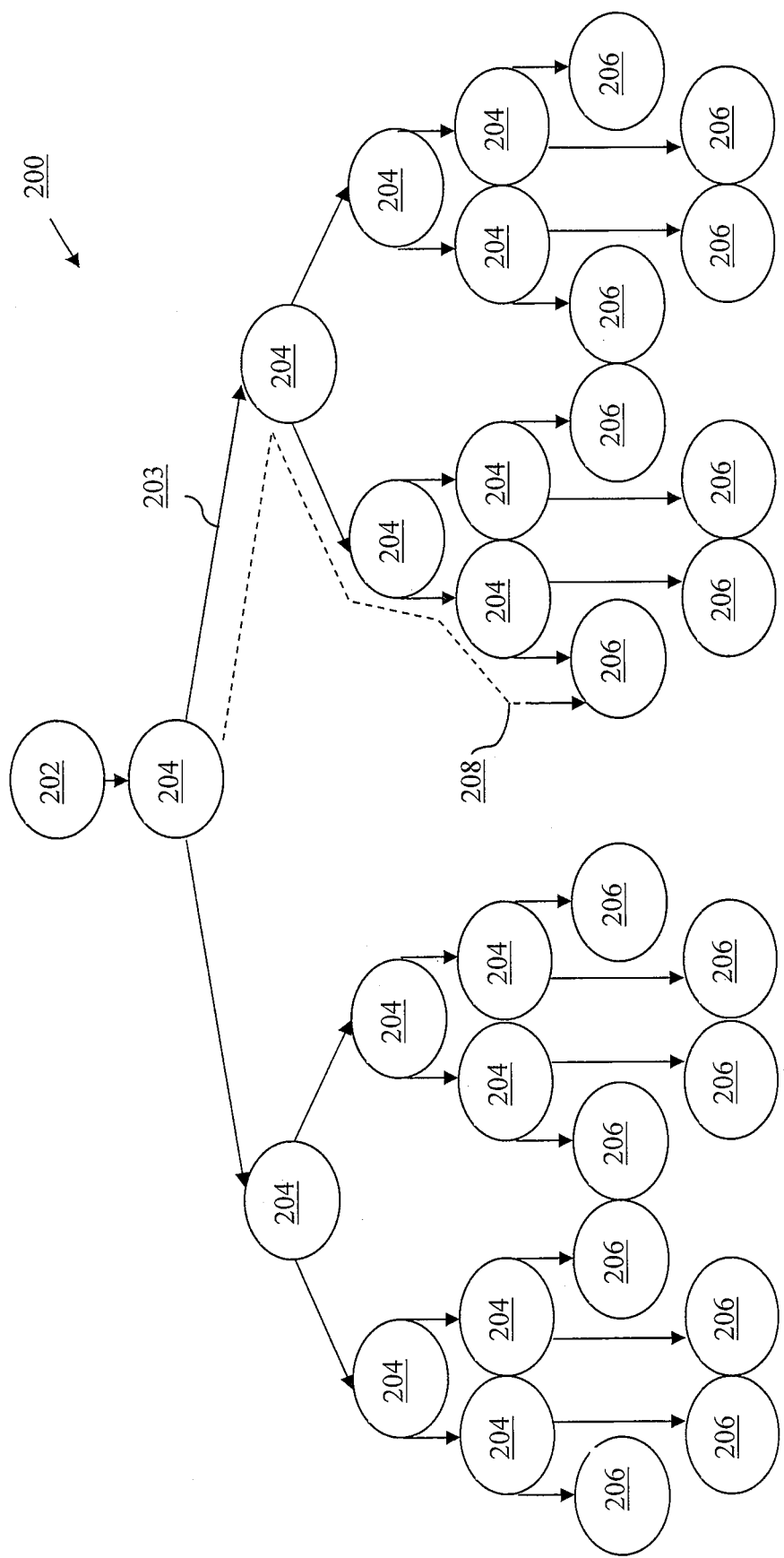
FIG. 2 is a schematic diagram of a tree for use in document ranking in accordance with one or more embodiments.

Referring to FIG. 2, a schematic diagram of a tree for use in document ranking is illustrated. As discussed above ranking component 106 (FIG. 1) may comprise one or more trees 200. Here, trees 200 may express and/or represent such hierarchical information in any one of several forms such as, for example, a computer accessible memory. Information in such a tree 200 may be expressed as a finite, rooted, connected, acyclic graph. In general, such a tree 200 may comprise a root node 202 that may not have any preceding parent nodes. Such a root node 202 may be a node at which operations on a tree 200 may begin. Such a tree 200 may be traversed via edges 203 to reach a given leaf node 206. A leaf node 206 may comprise a node that may not have any subsequent child nodes. Such a leaf node 206 may represent a possible value of a target variable based at least in part on given values of variables represented by a path 208 between a root 202 and a given leaf node 206. An interior node 204 may have a preceding parent node, such as a root node 202 or another interior node 204, and may have subsequent child nodes, such as leaf nodes 206 or other interior nodes 204.

Such decision tress 202 may be utilized to determine a value associate with a given item, such as an electronic document. Ranking component 106 (FIG. 1) may comprise a ranking algorithm wherein a score of associated with an electronic document may be incremented in an iterative fashion based at least in part on one or more trees. Such iterations may involve traversing a tree guided by characteristics associated with a given electronic document. On traversing a leaf node 206, a score of associated with a given electronic document may be incremented by the value associated with that particular leaf node 206. Such a procedure may be illustrated by the following example portion of code:

```
for each tree
...
int nNodes = numNodes[i];
// traverse each tree
while (1)
  ...
  if (cond)
    break
```

```
  end while
  // update the document score
  _score += leaves [...]
  ...
end for
``` where trees 200 may be traversed to obtain a "score" of a given electronic document. Such a score may be updated to include the value of addition "leaves" corresponding with leaf nodes 206.

For example, ranking component 106 (FIG. 1) may rank a given electronic document by taking one or more feature values associated with the electronic document and comparing such feature values with one or more threshold values associated with one or more nodes contained within one or more trees 202. As used herein, the term "threshold value" may refer to a value associated with a node of a tree that may be capable of indicating which edge 203 of a tree should be followed when such a threshold value is compared to a given feature value. For example, such a feature value may be compared to such threshold values by traversing root node 202 and various interior nodes 204 of a given decision tree 202 to reach a target value associated with a given leaf node 206. Such a leaf node 206 may represent a possible target value based at least in part on values of the variables represented by the particular path 208 leading from the root node 202 to the particular leaf node 206 via the internal nodes 204. Such operations may be referred to as "walking the tree" and/or "traversing the tree".

Figure 3:
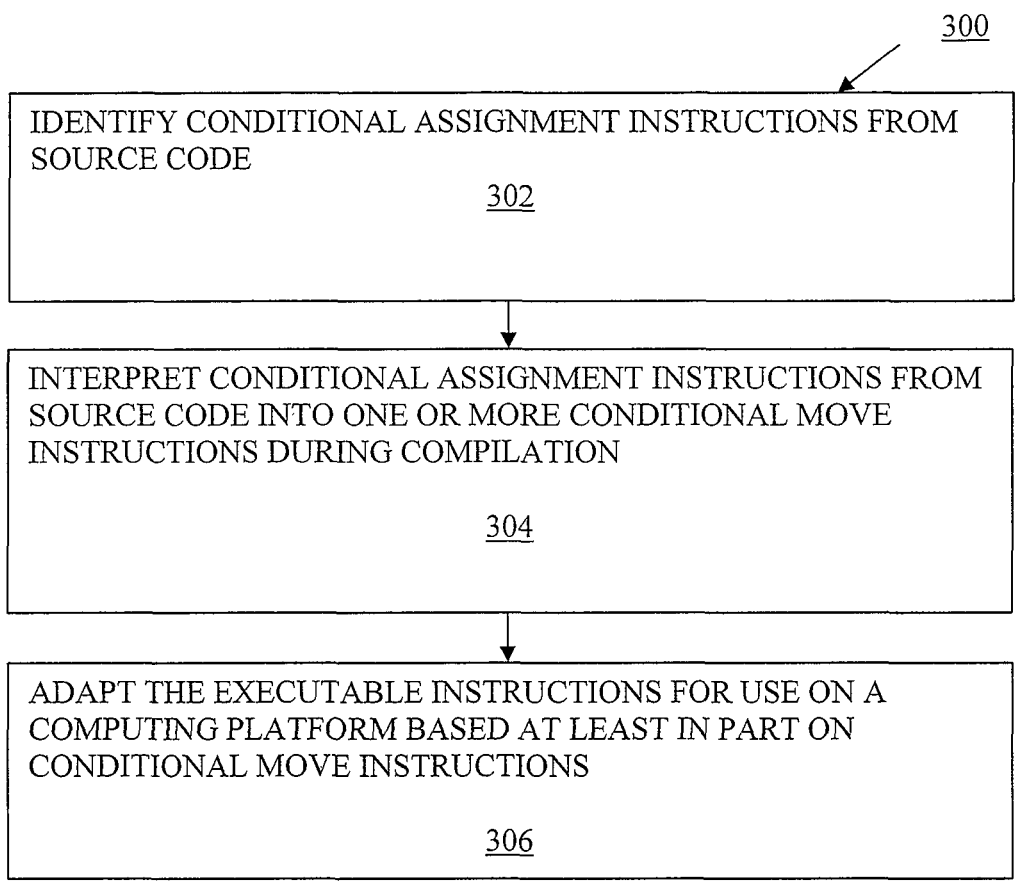
FIG. 3 is a flow diagram illustrating a procedure for altering an expression of executable instructions through compiler based procedures in accordance with one or more embodiments.

Procedure 300, as illustrated in FIG. 3, may be used to alter an expression of executable instructions through compiler based procedures for use in ranking of electronic documents in accordance with one or more embodiments, for example, although the scope of claimed subject matter is not limited in this respect. Additionally, although procedure 300, as shown in FIG. 3, comprises one particular order of blocks, the order in which the blocks are presented does not necessarily limit claimed subject matter to any particular order. Likewise, intervening blocks shown in FIG. 3 and/or additional blocks not shown in FIG. 3 may be employed and/or blocks shown in FIG. 3 may be eliminated, without departing from the scope of claimed subject matter.

Procedure 300, depicted in FIG. 3, may in alternative embodiments be implemented in software, hardware, and/or firmware, and may comprise discrete operations. As illustrated, procedure 300 may be used for altering an expression of executable instructions through compiler based procedures for use in ranking of electronic documents via a document ranking component. During compilation, code associated with a ranking component 106 (FIG. 1) may be interpreted from a source code into an executable instruction. During such an interpretation, a compiler component may alter an expression of executable instructions to improve performance. Procedure 300 may start at block 302 where one or more conditional assignment instructions from source code may be identified. At block 304, such conditional assignment instructions may be interpreted from source code into one or more conditional move instructions expressed in executable instructions during compilation. Such conditional move instructions may be capable of directing traversal of nodes in one or more trees associated with a ranking component.

Such conditional assignment instructions from source code may be partially illustrated by the following example portion of code:

```
if (x >= y)
    x = y;
else
    x = z;
``` illustrating an example conditional assignment instruction in C-type source code.

In a first approach, a compiler may interpret such source code into executable instructions, as follows:

```
    cmp x, y
    jge L1:       // Jump if greater than equal to
    mov x, z;     // Copy z to x
    jge L2:
L1: mov x, y;     // Copy y to x
L2:
``` illustrating an example compare/jump pair of instructions, which also may be referred to as CMP-JMP instructions.

Conversely, as described above, procedure 300 may result in conditional assignment instructions instead of being interpreted from source code into one or more conditional move instructions during compilation, as follows:

```
    mov x, z;              // Copy z to x
    cmp x, y
    cmovge x, y;           // Copy y to x if x >= y
``` illustrating a modified executable instruction, where the cmovge instruction illustrates a "CMOVcc-type" instruction as an example of a conditional move instruction. The modified executable instruction is smaller as compared with the executable instruction from the first approach which may improve performance.

Further, a jump portion of the compare/jump pair of instructions has been eliminated in the modified executable instruction. This may reduce branch prediction and performance penalties associated with such branch prediction. In computer architecture, a processor may determine whether a conditional branch in an instruction flow of a program is likely to be taken or not. Such a determination may be referred to as branch prediction. Accordingly, a processor may speculate on a result of a conditional branch to skip ahead without waiting for a given conditional branch to be fully resolved. Correct branch prediction may result in conservation of computing power. However, incorrect branch predictions may result in wasted computing power.

As described above, a given tree may include a number of interior nodes and leaf nodes. Branch prediction may be triggered at any one of such interior nodes and/or leaf nodes. Branch prediction may be prompted based at least in part on a conditional assignment instruction in a source code, such as may be identified at block 302. As discussed above, such a conditional assignment instruction might be interpreted from a source code by a compiler into executable instructions including a compare/jump pair of instructions in the first approach. However, such an interpretation may result in branch predictions that may result in wasted computing power.

Conversely, embodiments described herein may comprise interpreting such a conditional assignment instruction from a source code into a conditional move instruction into executable instructions via a compiler component. Such an interpretation may have fewer instructions for a similar operation as compared to a compare/jump pair of instructions. Further, such an interpretation may not result in branch predictions, potentially conserving computing power. Instead, such a conditional move instruction may compare two or more values to determine if a given condition is satisfied or not.

In a tree environment utilized for ranking of electronic documents, a given tree may include a number of interior nodes and leaf nodes. Accordingly, how a given tree is traversed may be modified by compiler component based at least in part on incorporating such conditional move instructions in the executable instructions. Branch prediction may then be avoided at any one of such interior nodes and/or leaf nodes through use of such conditional move instructions. Such conditional move instructions may becomes increasingly effective as the number of trees and/or the number of nodes in trees increases. For example, with more and more machine learned models being deployed to boost the relevance of search results, any gains shown in employing such conditional move instructions may become more pronounced.

At block 306, executable instructions may be adapted for use on a computing platform based at least in part on such conditional move instructions. Such executable instructions may comprise a ranking component capable of ranking electronic documents based at least in part on one or more trees. Such a ranking may be based at least in part on feature values associated with electronic documents. As discussed above, once ranking component 106 (FIG. 1) has received a result set and corresponding feature values, ranking component 106 may determine an importance score associated with the electronic documents from the result set based at least in part on such feature values. Such an importance score may be assigned to electronic documents depending on the traversing one or more trees based at least in part on feature values associated with such electronic documents. Ranking component 106 may be capable of ranking such a result set such that the most relevant electronic documents in the result set are presented to a user first, based at least in part on such an importance score.

Figure 4:
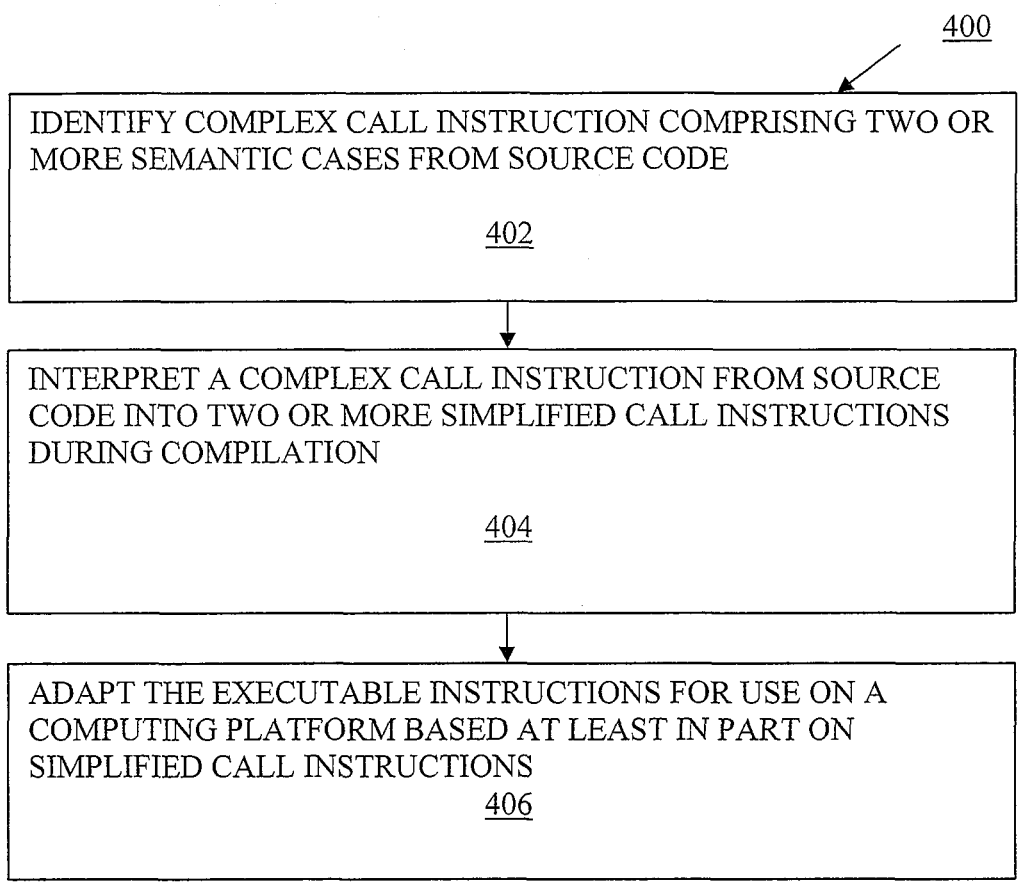
FIG. 4 is a flow diagram illustrating a procedure for altering an expression of executable instructions through compiler based procedures for use in ranking of electronic documents in accordance with one or more embodiments.

Procedure 400, as illustrated in FIG. 4, may be used to alter an expression of executable instructions through compiler based procedures in accordance with one or more embodiments, for example, although the scope of claimed subject matter is not limited in this respect. Additionally, although procedure 400, as shown in FIG. 4, comprises one particular order of blocks, the order in which the blocks are presented does not necessarily limit claimed subject matter to any particular order. Likewise, intervening blocks shown in FIG. 4 and/or additional blocks not shown in FIG. 4 may be employed and/or blocks shown in FIG. 4 may be eliminated, without departing from the scope of claimed subject matter.

Procedure 400, depicted in FIG. 4, may in alternative embodiments be implemented in software, hardware, and/or firmware, and may comprise discrete operations. As illustrated, procedure 400 may be used for altering an expression of executable instructions through compiler based procedures. During compilation, code may be interpreted from a source code into executable instructions. During such an interpretation, a compiler component may alter an expression of executable instructions to improve performance. Procedure 400 may start at block 402 where a complex call instruction comprising two or more case statements from source code may be identified. At block 404, such a complex call instruction may be interpreted from source code into two or more simplified call instructions during compilation. Such simplified call instructions may each comprise a single case statement. Further, simplified call instructions may be capable of operation without use of a switch condition.

Call instructions comprising two or more case statements, as referred to herein, also may be understood as "semantically complex". Such semantically complex call instructions may comprise a multi-level call instruction that reuses a single function (such as "foo" for example) for multiple cases (such as cases A, B, etc.). In a first approach, such a semantically complex call instruction might be interpreted from a source code by a compiler into a semantically oblivious instruction in executable instructions. However, a such a semantically oblivious instruction may include a switch statement that may result in wasted computing power, as may be partially illustrated by the following example portion of code:

```
void foo (cond) {                void bar ( ) {
    switch (cond)                    ...
    {                                foo (A);
        case A:                      ...
            ...                      foo (B);
            break;                   ...
        case B:                  }
            ...
            break;
    }
}
``` illustrating an example semantically complex call instruction comprising two or more case statements from source code. Here, a function "foo" is called inside the function "bar". Further, the "switch (cond)" portion of the code comprises a switch condition. The function "foo" may be potentially inlined at each call site in the function bar as an optimization. As used herein, the term "function inlining" may refer to inlining a given function at every call site. For example, if a function is invoked, control may be transferred to its definition by a branch or call instruction; whereas with inlining, the function may be "spliced in" to the caller. However, experimental analysis shows that such an inlining optimization led to degradation in performance. Such degradation may have occurred due to a large size of the function being inlined.

Conversely, procedure 400 may be "semantically aware" of the semantically complex nature of a call instruction in source code. Accordingly, procedure 400 may interpret such a semantically complex call instruction from a source code into a semantically aware simplified call instruction in executable instructions via a compiler component. Such an interpretation may parse the multiple cases (such as cases A, B, etc.) associated with a single function (such as "foo" for example) into multiple separate functions. Such an interpretation may accordingly avoid incorporation of a switch statement in the executable instructions. For example, if a first function specific to a first case "foo_A" is executed, a second function specific to a second case "foo_B" may not need to also be executed. Likewise, if a second function specific to a second case "foo_B" is executed, a first function specific to a first case "foo_A" may not need to also be executed. Accordingly, a switch statement for switching between a first case and a second case may be eliminated.

For example, procedure 400 may exploit the fact that the value of a condition may be known at the call site of the foo function. Based on this, procedure 400 may introduce two or more simplified call instructions during compilation. Such simplified call instructions may each comprise a single case statement. For example, two simplified call instructions of the foo function may be generated, foo_A and foo_B, as illustrated in the code below. Additionally or alternatively, procedure 400 may eliminate the switch condition inside foo_A and foo_B, as shown below:

```
void foo_A ( )                   void foo_B ( )
{                                {
    // case A:                       // case B:
    ...                              ...
}                                }
``` illustrating a modified executable instruction, where the functions foo_A and foo_B illustrate an example of two or more simplified call instructions. The body of the functions foo_A and foo_B may comprise of the statements corresponding to "case A" and "case B" in the original function foo. Accordingly, the operation at block 404 may have dual benefits of eliminating the execution of a switch condition at every call site of foo and/or reducing the size of the function foo. Such a reduction in the size of the function foo may thereby make inlining of the two versions foo profitable. For example, function inlining may be utilized when a function is executed frequently and has a small foot print. The operation of at block 404 may have the benefit reducing the size of the function foo, thereby increasing the likelihood that function inlining may be effective. Accordingly, the two or more simplified call instructions created at block 404 (such as foo_A and foo_B) may be inlined based on the value of the variable "cond" at the call site. Further, as discussed above, procedures from a first approach also may utilize function inlining; however these procedures may not perform the operations of block 404, and therefore, may not handle inlining of large functions without performance degradation.

Additionally or alternatively, avoidance of a switch statement also may avoid branch prediction. For example, a switch statement may comprise a comparison function triggering various branches. Such semantically aware simplified call instructions, as interpreted by block 404, may remove such a comparison function, and may therefore, also avoid branch prediction.

In a tree environment, such semantically aware simplified call instructions, as interpreted by block 404, may not be directly associated with comparisons of feature values to threshold values during tree traversal. At a given node, in addition to a comparison of a feature value to a threshold value, other computations may be performed. Here, a semantically aware simplified call instruction may relate to preliminary computations that may be made prior to descending down a particular edge of a tree. For example, a feature value may indicate that a given electronic document relates to entertainment content, while additional data may indicate that the given electronic document relates to sports in a first case or music in a second case. Such additional data may therefore be utilized for a more defined tree traversal. However, such a semantically aware simplified call instruction may be also be advantageously implemented in environments other than a search engine environment and/or a tree environment.

At block 406, executable instructions may be adapted for use on a computing platform based at least in part on such simplified call instructions. Additionally or alternatively, such executable instructions may be capable of ranking electronic documents. In such a case, executable instructions may comprise a ranking component capable of ranking electronic documents based at least in part on one or more trees.

Figure 5:
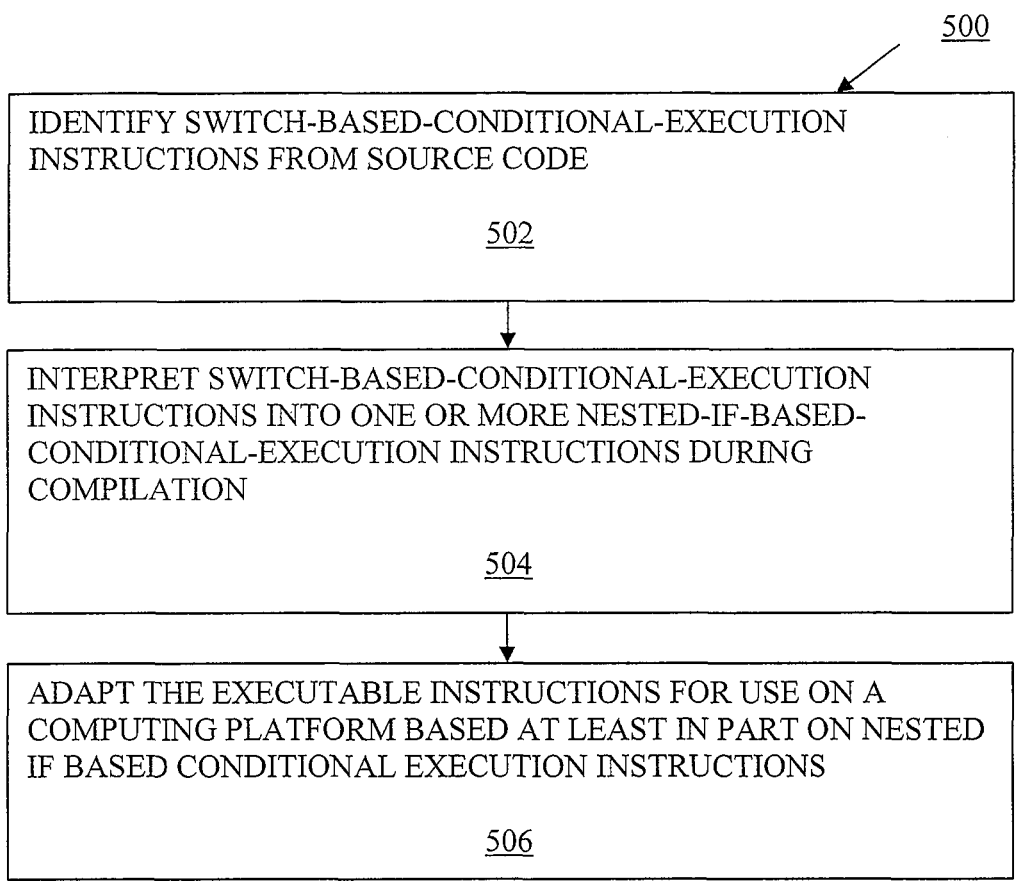
FIG. 5 is a flow diagram illustrating a procedure for altering an expression of executable instructions through compiler based procedures for use in ranking of electronic documents in accordance with one or more embodiments.

Procedure 500, as illustrated in FIG. 5, may be used to alter an expression of executable instructions through compiler based procedures for use in ranking of electronic documents in accordance with one or more embodiments, for example, although the scope of claimed subject matter is not limited in this respect. Additionally, although procedure 500, as shown in FIG. 5, comprises one particular order of blocks, the order in which the blocks are presented does not necessarily limit claimed subject matter to any particular order. Likewise, intervening blocks shown in FIG. 5 and/or additional blocks not shown in FIG. 5 may be employed and/or blocks shown in FIG. 5 may be eliminated, without departing from the scope of claimed subject matter.

Procedure 500, depicted in FIG. 5, may in alternative embodiments be implemented in software, hardware, and/or firmware, and may comprise discrete operations. As illustrated, procedure 500 may be used for altering an expression of executable instructions through compiler based procedures for use in ranking of electronic documents via a document ranking component. During compilation, code associated with a ranking component 106 (FIG. 1) may be interpreted from a source code into executable instructions. During such an interpretation, a compiler component may alter an expression of executable instructions to improve performance. Procedure 500 may start at block 502 where switch-based-conditional-execution instructions from source code may be identified. As used herein, the term "switch-based-conditional-execution instruction" may refer to conditional statements, conditional expressions and/or conditional constructs where a given value may be compared with specified constants and action may be taken according to the first constant to match. Such switch-based-conditional-execution instructions may comprise one or more indirect branch instructions. Such indirect branch instructions may be capable of retrieving one or more feature values associated with one or more electronic documents from a main memory. At block 504, such switch-based-conditional-execution instructions may be interpreted into one or more nested-if-based-conditional-execution instructions during compilation. As used herein, the term "nested-if-based-conditional-execution instruction" may refer to conditional statements, conditional expressions and/or conditional constructs where only statements following a first condition found to be true will be executed. Such nested-if-based-conditional-execution instructions may comprise one or more direct branch instructions. Such direct branch instructions may be capable of retrieving one or more feature values associated with one or more electronic documents from a register memory.

Switch-based-conditional-execution instructions may be utilized in source code. Such switch-based-conditional-execution instructions may cause indirect branch instructions to call feature values associated with one or more electronic documents from a main memory. As used herein, the term "indirect branch" may refer to a type of program control instruction present in some machine language instruction sets, such as may also be known as a computed jump, indirect jump and register-indirect jump, for example. Such indirect branch instructions may specify where a given address is located rather than specifying the address of the next instruction to execute. Accordingly, such indirect branch instructions may call feature values associated with one or more electronic documents from a main memory. Such accesses to main memory may adversely impact performance in some cases.

Such switch-based-conditional-execution instructions from source code may be partially illustrated by the following example portion of code:

```
switch (cond)
{
    case A:
        ...
        break;
    case B:
        ...
        break;
    ...
    default:
        ...
        break;
}
``` illustrating an example switch-based-conditional-execution instructions from source code. Assembly code corresponding to the above switch-based-conditional-execution instruction is show below:

```
leaq    .L12(%rip), %rdx
mov     %eax, %ecx
movslq  (%rdx,%rcx,4),%rax
addq    %rdx, %rax
jmp     *%rax
``` illustrating an example where indirect addressing is used for the "jmp" instruction. For example, the "leaq" instruction is a load effective address and "movslq" is an indirect branch instruction where each may call feature values associated with one or more electronic documents from a main memory. Such accesses to main memory may adversely impact performance in some cases.

Conversely, as described above, procedure 500 may transform such switch-based-conditional-execution instructions into one or more nested-if-based-conditional-execution instructions during compilation, as illustrated below:

```
if (cond == A) {
    ...
}
    else if (cond == B) {
    ...
}
    else if (...)
    ...
}
    else {
    ...
}
```

Assembly code corresponding to the above nested-if-based-conditional-execution instruction is show below:

```
movl    4(%rsi), %edx
cmpl    $3, %edx
je      .L27
``` illustrating an example where direct addressing is used for the "je" instruction. For example, the "cmpl" instruction is a direct branch instruction that may call feature values associated with one or more electronic documents from a register memory. Such access to register memory may reduce the adverse impacts to performance potentially caused by accesses to main memory. Conversely, switch-based-conditional-execution instructions may cause indirect branch instructions to call feature values associated with one or more electronic documents from a main memory. Such accesses to main memory may adversely impact performance in some cases. For example, one benefit the transformation of procedure 500 may stem from hardware branch predictors having a higher accuracy for direct branches as compared to indirect branches.

Such operations, as at block 504, of interpreting switch-based-conditional-execution instructions into one or more nested-if-based-conditional-execution instructions during compilation may show an increasing benefit as a scale of search systems also increases. For example, such a scale of search systems may be impacted as a corpus of electronic documents increases and/or as a number of different features used to learn about electronic documents increases. With a scale of search systems increasing, such utilization of nested-if-based-conditional-execution instructions, as described above, may become advantageous.

At block 506, executable instructions may be adapted for use on a computing platform based at least in part on such nested-if-based-conditional-execution instructions. Such executable instructions may comprise a ranking component capable of ranking electronic documents based at least in part on comparing such one or more feature values against one or more threshold values associated with one or more trees.

Referring to FIGS. 3, 4 and 5, experimental results implementing portions of one or more embodiments were performed using a commercially available compiler (a GCC version 3.4.4 type compiler), real hardware (Quad-Core Intel® Xeon® type processor), a production query log and an implementation of a machine learning-based ranking (MLR) library, such as ranking library 108 (FIG. 1).

Experimental results found that ranking of electronic documents by ranking component 106 (FIG. 1), without implementing portions of one or more embodiments, may account for approximately 14% of a total query processing time of a search engine 102 (FIG. 1). In other words, an MLR library may have a 14% coverage. Such coverage of the MLR library was obtained using in-built non-intrusive hardware performance counters. Such hardware performance counters were utilized to identify source level causes of performance degradation during the scoring process. An L2_LINES_IN.SELF.DEMAND counter may indicate a number of L2 cache misses, and may be used to determine which data items to prefetch and/or which data items to avoid being thrown out of the L2 cache, for example. Accordingly, an optimization of an MLR library may reduce the query processing time and may in turn improve a ratio of commercial expense per query. As a result, improved efficiency in an MLR library may reduce the query processing time and may enable processing of a larger number of queries at a similar commercial expense. Additionally or alternatively, improved efficiency in an MLR library may allow more processing intensive queries to be performed at a similar commercial expense.

In general, experimental results implementing prefetching techniques in accordance with one or more embodiments speedup the experimental implementation of an MLR library by approximately 20%. Compiler based procedures 300, 400, and 500 were utilized to change the layout of code to improve performance.

Based at least in part on operations described at block 304 of FIG. 3, conditional assignment instructions were interpreted into one or more conditional move instructions during compilation. Experimental results illustrated a performance gain based on an implementation of block 304 as yielding approximately a 5.0% performance gain.

Based at least in part on operations described at block 404 of FIG. 4, semantically complex call instructions were interpreted from source code into two or more simplified call instructions during compilation and inlined. Experimental results illustrated a performance gain based on an implementation of block 404 as yielding approximately a 17.0% performance gain.

Based at least in part on operations described at block 504 of FIG. 5, switch-based-conditional-execution instructions were interpreted into one or more nested-if-based-conditional-execution instructions during compilation. Experimental results illustrated a performance gain based on an implementation of block 504 as yielding approximately a 1.0% performance gain.

Accordingly, procedures 300, 400, and/or 500 may reduce a query processing time and/or improves a cost per query ratio. Accordingly, procedures 300, 400, and/or 500 may permit processing of a larger number of queries 300, 400, and/or 500 may be compounded based on query processing done over a cluster of tens of thousands of nodes.

Procedures 300, 400, and/or 500 illustrated in FIGS. 3, 4, and 5 may be compiler-based. Accordingly, procedures 300, 400, and/or 500 may not require any algorithmic changes to search engine 102 (FIG. 1) and/or may not require any hardware changes in a computer platform executing search engine 102. In contrast, existing approaches that focus at algorithmic level optimizations may be not address an underlying micro-architecture of a given computing platform. For example, conventional optimization procedures may focus on an optimization of cache performance of an indexer, without addressing micro-architecture aware optimization.

Further procedures 300, 400, and/or 500 may be targeted towards array-based implementation of a ranking library 108 (FIG. 1). Conversely, nested if-then-else based implementation may incur incorrect branch predictions, which may adversely impact performance.

Lastly, procedures 300, 400, and/or 500 may be transparent to a designer of a search engine 102 (FIG. 1), a designer of a ranking library 108 (FIG. 1), and/or a programmer. For example, a given implementation of a ranking library 108 and a given hardware platform may be provided as input and procedures 300, 400, and/or 500 may provide an output of an optimized search engine 102 and/or ranking library 108.

Figure 6:
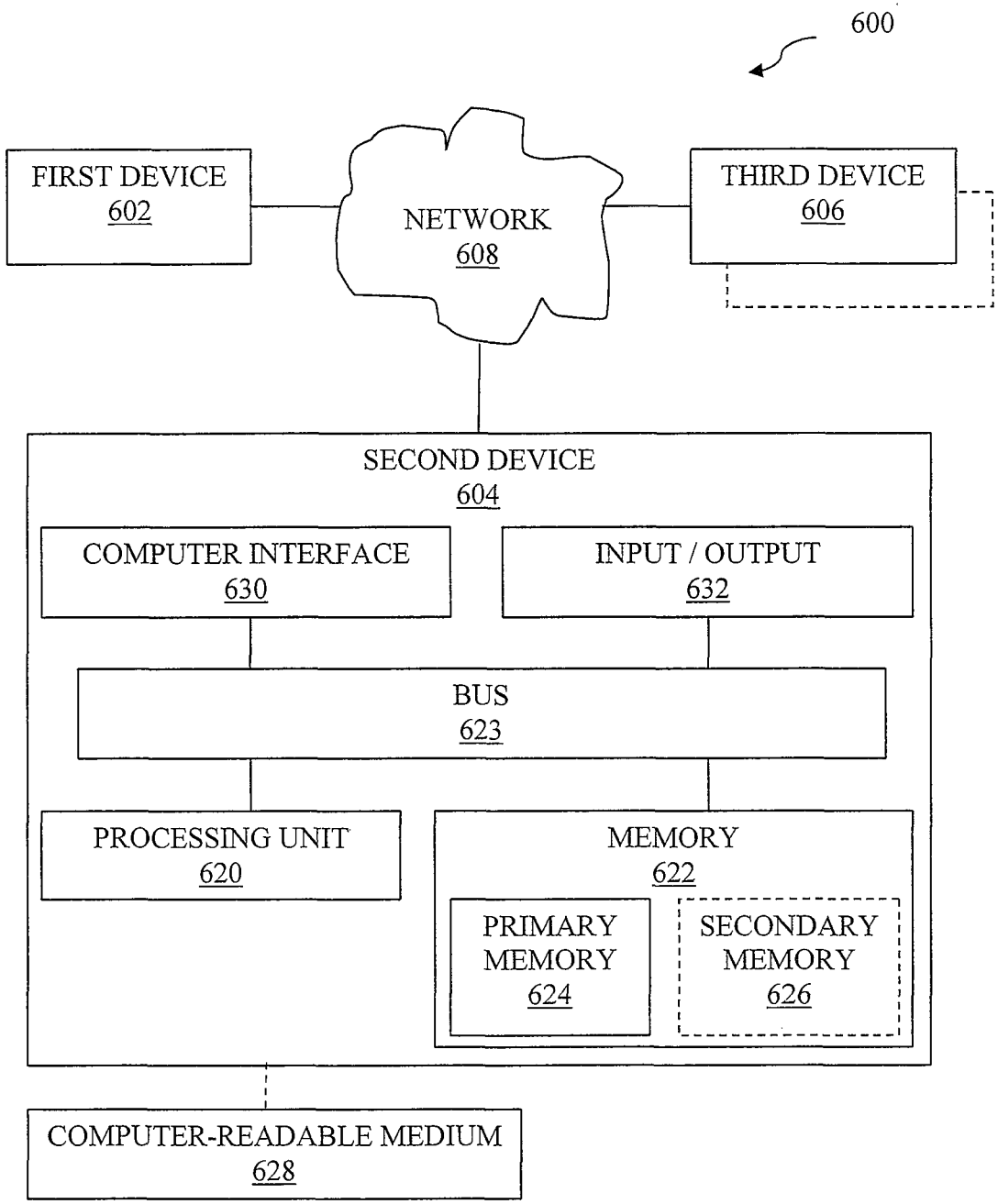
FIG. 6 is a schematic diagram of a computing platform in accordance with one or more embodiments.

FIG. 6 is a schematic diagram illustrating an exemplary embodiment of a computing environment system 600 that may include one or more devices configurable to rank electronic documents using one or more techniques illustrated above, for example. System 600 may include, for example, a first device 602, a second device 604, and a third device 606, which may be operatively coupled together through a network 608.

First device 602, second device 604, and third device 606, as shown in FIG. 6, may be representative of any device, appliance, or machine that may be configurable to exchange data over network 608. By way of example, but not limitation, any of first device 602, second device 604, or third device 606 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 608, as shown in FIG. 6, is representative of one or more communication links, processes, and/or resources configurable to support the exchange of data between at least two of first device 602, second device 604, and third device 606. By way of example, but not limitation, network 608 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 606, there may be additional like devices operatively coupled to network 608.

It is recognized that all or part of the various devices and networks shown in system 600, and the processes and methods as further described herein, may be implemented using, or otherwise including, hardware, firmware, software, or any combination thereof.

Thus, by way of example, but not limitation, second device 604 may include at least one processing unit 620 that is operatively coupled to a memory 622 through a bus 623.

Processing unit 620 is representative of one or more circuits configurable to perform at least a portion of a data computing procedure or process. By way of example, but not limitation, processing unit 620 may include one or more processors, controllers, microprocessors, microcontrollers, application specific integrated circuits, digital signal processors, programmable logic devices, field programmable gate arrays, and the like, or any combination thereof.

Memory 622 is representative of any data storage mechanism. Memory 622 may include, for example, a primary memory 624 and/or a secondary memory 626. Primary memory 624 may include, for example, a random access memory, read only memory, etc. While illustrated in this example as being separate from processing unit 620, it should be understood that all or part of primary memory 624 may be provided within or otherwise co-located/coupled with processing unit 620.

Secondary memory 626 may include, for example, the same or similar type of memory as primary memory and/or one or more data storage devices or systems, such as, for example, a disk drive, an optical disc drive, a tape drive, a solid state memory drive, etc. In certain implementations, secondary memory 626 may be operatively receptive of, or otherwise configurable to couple to, a computer-readable medium 628. Computer-readable medium 628 may include, for example, any medium that can carry and/or make accessible data, code and/or instructions for one or more of the devices in system 600.

Second device 604 may include, for example, a communication interface 630 that provides for or otherwise supports the operative coupling of second device 604 to at least network 608. By way of example, but not limitation, communication interface 630 may include a network interface device or card, a modem, a router, a switch, a transceiver, and the like.

Second device 604 may include, for example, an input/output 632. Input/output 632 is representative of one or more devices or features that may be configurable to accept or otherwise introduce human and/or machine inputs, and/or one or more devices or features that may be configurable to deliver or otherwise provide for human and/or machine outputs. By way of example, but not limitation, input/output device 632 may include an operatively configured display, speaker, keyboard, mouse, trackball, touch screen, data port, etc.

With regard to system 600, in certain implementations, first device 602 may be configurable to tangibly embody all or a portion of procedure 100 of FIG. 1, procedure 300 of FIG. 3, procedure 400 of FIG. 4 and/or procedure 500 of FIG. 5. In certain implementations, first device 602 may be configurable to adapt executable instructions comprising a ranking component capable of ranking electronic documents. For example, we can apply a process in first device 602 where code associated with a ranking component may be interpreted via first device 602 from a source code into executable instructions, during compilation. During such an interpretation, a compiler component may alter an expression of executable instructions to improve performance of a ranking component.

Embodiments claimed may include algorithms, programs and/or symbolic representations of operations on data bits or binary digital signals within a computer memory capable of performing one or more of the operations described herein. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the preceding discussion, it is appreciated that throughout this specification discussions utilizing terms such as processing, computing, calculating, selecting, forming, transforming, defining, mapping, converting, associating, enabling, inhibiting, identifying, initiating, communicating, receiving, transmitting, determining, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes that fall within the true spirit of claimed subject matter.

What is claimed is:

1. A method, comprising:
    compiling source code into executable instructions;
    modifying said executable instructions, in response to said compiling, comprising modifying one or more conditional assignment instructions into one or more conditional move instructions, wherein said conditional move instructions specify traversal of nodes in one or more trees associated with a ranking component, said one or more conditional move instructions comprising one or more instructions to copy one or more values into one or more registers at least partially in response to one or more conditions;
    adapting said executable instructions for use on a computing platform based at least in part on said one or more conditional move instructions, wherein said executable instructions comprises said a ranking component to specify ranking electronic documents based at least in part on said one or more trees; and
    interpreting at least one complex call instruction comprising two or more case statements from source code into two or more simplified call instructions comprising a single case statement during compilation, wherein said two or more simplified call instructions specify operation without use of a switch condition.

2. The method of claim 1, further comprising:
    adapting said executable instructions for use on a computing platform based at least in part on said two or more simplified call instructions.

3. The method of claim 1, further comprising: interpreting one or more switch-based-conditional-execution instructions with one or more nested-if-based-conditional-execution instructions during compilation, wherein said one or more switch-based-conditional-execution instructions comprise one or more indirect branch instructions to retrieve one or more feature values associated with one or more electronic documents from a main memory, and wherein said one or more nested-if-based-conditional-execution instructions comprise one or more direct branch instructions specify retrieval of one or more feature values associated with one or more electronic documents from a register memory.

4. The method of claim 1, further comprising:
    adapting said executable instructions for use on a computing platform based at least in part on said nested-if-based-conditional-execution instructions, and wherein said ranking component specifies comparing said one or more feature values against one or more threshold values associated with said one or more trees.

5. The method of claim 1, further comprising:
    adapting said executable instructions for use on a computing platform based at least in part on said two or more simplified call instructions and on said nested-if-based-conditional-execution instructions, and wherein said ranking component specifies comparison of said one or more feature values against one or more threshold values associated with said one or more trees.

6. The method of claim 1, wherein said one or more electronic documents comprise web pages.

7. An article comprising:
    a non-transitory storage medium comprising machine-readable instructions stored thereon which are executable by a computing platform to:
    compile source code into executable instructions;
    modify said executable instructions, in response to said compiling, comprising modifying one or more conditional assignment instructions into one or more conditional move instructions, wherein said conditional move instructions specify traversal of nodes in one or more trees associated with a ranking component, said one or more conditional move instructions comprising one or more instructions to copy one or more values into one or more registers at least partially in response to one or more conditions;
    adapt said executable instructions for use on a computing platform based at least in part on said one or more conditional move instructions, wherein said executable instructions comprises a ranking component to specify ranking electronic documents based at least in part on said one or more trees; and
    interpret at least one complex call instruction comprising two or more case statements from source code into two or more simplified call instructions comprising a single case statement during compilation, wherein said two or more simplified call instructions specify operation without use of a switch condition.

8. The article of claim 7, wherein said machine-readable instructions are further executable by said computing platform to:
    interpret one or more conditional assignment instructions from source code into one or more conditional move instructions expressed in executable instructions during compilation, wherein said conditional move instructions specify traversal of nodes in one or more trees associated with a ranking component; and
    adapt said executable instructions for use on a computing platform based at least in part on said one or more conditional move instructions, wherein said executable instructions comprises a ranking component specifying ranking electronic documents based at least in part on said one or more trees.

9. The article of claim 7, wherein said machine-readable instructions are further executable by said computing platform to:
    interpret one or more switch-based-conditional-execution instructions with one or more nested-if-based-conditional-execution instructions during compilation, wherein said one or more switch-based-conditional-execution instructions comprise one or more indirect branch instructions specifying retrieval of one or more feature values associated with one or more electronic documents from a main memory, and wherein said one or more nested-if-based-conditional-execution instructions comprise one or more direct branch instructions specifying retrieval of one or more feature values associated with one or more electronic documents from a register memory; and adapt said executable instructions for use on a computing platform based at least in part on said nested-if-based-conditional-execution instructions, wherein said executable instructions comprises a ranking component to rank electronic documents based at least in part on comparing said one or more feature values against one or more threshold values associated with one or more trees.

10. An apparatus comprising: a computing platform to:

compile source code into executable instructions;

modify said executable instructions, in response to executing said compiled source code, wherein in response to identifying one or more switch-based-conditional-execution instructions in said executable instructions, modify said one or more switch-based-conditional-execution instructions into one or more nested-if-based-conditional-execution instructions, wherein said one or more switch-based-conditional-execution instructions comprise one or more indirect branch instructions specifying retrieval of one or more feature values associated with one or more electronic documents from a main memory, and wherein said one or more nested-if-based-conditional-execution instructions comprise one or more direct branch instructions specifying retrieval of one or more feature values associated with one or more electronic documents from a register memory specified by said one or more direct branch instructions; and adapt executable instructions for use on said computing platform based at least in part on said nested-if-based-conditional-execution instructions, wherein said executable instructions comprises a ranking component specifying ranking electronic documents based at least in part on comparing said one or more feature values against one or more threshold values associated with one or more trees.

11. The apparatus of claim 10, said computing platform to further:

interpret one or more conditional assignment instructions from source code into one or more conditional move instructions expressed in executable instructions during compilation, wherein said conditional move instructions specify traversal of nodes in one or more trees associated with a ranking component; and adapt said executable instructions for use on a computing platform based at least in part on said one or more conditional move instructions, wherein said executable instructions comprises a ranking component specifying ranking electronic documents based at least in part on said one or more trees.

12. The apparatus of claim 10, said computing platform to further:

interpret at least one complex call instruction comprising two or more case statements from source code into two or more simplified call instructions comprising a single case statement during compilation, wherein said two or more simplified call instructions specifying operation without use of a switch condition; and adapt said executable instructions for use on a computing platform based at least in part on said two or more simplified call instructions.

13. The apparatus of claim 10, wherein said one or more electronic documents comprise web pages.

* * * * *